(12) United States Patent
Beljambe et al.

(10) Patent No.: US 10,329,958 B2
(45) Date of Patent: Jun. 25, 2019

(54) CASING STRUCTURE INTERPOSED BETWEEN THE ENGINE AND THE NACELLE HAVING A MOUNTING PLATE WITH BOLTS

(71) Applicant: SAFRAN AIRCRAFT ENGINES, Paris (FR)

(72) Inventors: Ceddric Beljambe, Soignolles en Brie (FR); Noel Robin, Villejust (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 220 days.

(21) Appl. No.: 14/913,831

(22) PCT Filed: Aug. 25, 2014

(86) PCT No.: PCT/FR2014/052120
§ 371 (c)(1),
(2) Date: Feb. 23, 2016

(87) PCT Pub. No.: WO2015/033041
PCT Pub. Date: Mar. 12, 2015

(65) Prior Publication Data
US 2016/0208653 A1    Jul. 21, 2016

(30) Foreign Application Priority Data

Sep. 4, 2013  (FR) ..................................... 13 58475

(51) Int. Cl.
*F01D 9/04*        (2006.01)
*B64D 27/26*     (2006.01)
(Continued)

(52) U.S. Cl.
CPC ........... *F01D 25/243* (2013.01); *B64D 27/26* (2013.01); *B64D 29/06* (2013.01); *F01D 9/04* (2013.01);
(Continued)

(58) Field of Classification Search
CPC .......... B64C 7/02; B64D 29/06; B64D 29/00; B64D 27/26; B64D 2027/262; F02C 7/04; F01D 25/243; F01D 9/04
See application file for complete search history.

(56) References Cited

U.S. PATENT DOCUMENTS 4,594,761 A * 6/1986 Murphy .................. B23P 15/04
                                                                29/418
4,815,907 A * 3/1989 Williamson .......... F16B 35/041
                                                                403/408.1
(Continued)

FOREIGN PATENT DOCUMENTS

CH           705 514 A1    3/2013
CH          705514 A1 *  3/2013  ............... F01D 9/06
(Continued)

OTHER PUBLICATIONS

International Search Report dated Nov. 28, 2014, in PCT/FR2014/052120 filed Aug. 25, 2014.

*Primary Examiner* — Benjamin P Lee
(74) *Attorney, Agent, or Firm* — Oblon, McClelland, Maier & Neustadt, L.L.P.

(57) ABSTRACT

An aircraft casing structure including a shroud surrounding the engine and made up of a plurality of sectors; a plurality of radial arms, each mounted between two adjacent shroud sectors and each having a base; and a plurality of fasteners for fastening the shroud sectors on the bases of the radial arms; the fasteners including a plurality of plates each mounted flush in a respective groove of corresponding shape in a shroud sector, and a set of headed bolts held captive in the plate by a difference of diameter between their shanks and their threads, a set of captive nuts being fastened to the bases to provide a secure connection between the shroud (Continued)

sectors and the radial arms by each nut receiving the thread of a respective captive bolt of the set of headed bolts.

11 Claims, 1 Drawing Sheet

(51) Int. Cl.
    *B64D 29/06* (2006.01)
    *F01D 25/24* (2006.01)
(52) U.S. Cl.
    CPC .... *F05D 2220/323* (2013.01); *F05D 2230/60* (2013.01)

(56) References Cited

U.S. PATENT DOCUMENTS

| | | | |
|---|---|---|---|
| 4,917,555 A * | 4/1990 | Taubert | F16B 5/0275 411/168 |
| 4,993,918 A | 2/1991 | Myers et al. | |
| 5,320,490 A * | 6/1994 | Corbin | F01D 9/042 415/209.2 |
| 8,646,744 B2 * | 2/2014 | Duchatelle | F01D 9/04 248/637 |
| 8,967,932 B2 * | 3/2015 | Dionne | F16B 39/26 411/313 |
| 9,212,567 B2 * | 12/2015 | Rauch | F01D 25/30 |
| 2006/0251496 A1 * | 11/2006 | Wood | F16B 5/02 411/507 |
| 2007/0068136 A1 * | 3/2007 | Cameriano | F01D 5/147 60/200.1 |
| 2011/0073745 A1 | 3/2011 | Duchatelle et al. | |
| 2016/0208654 A1 * | 7/2016 | Beljambe | B64D 27/26 |

FOREIGN PATENT DOCUMENTS

| | | | | |
|---|---|---|---|---|
| EP | 2565400 A2 * | 3/2013 | | F01D 25/30 |
| EP | 2565400 A3 * | 10/2017 | | |
| FR | 2933130 A1 * | 1/2010 | | F01D 9/04 |
| WO | WO 2010/007220 A2 | 1/2010 | | |
| WO | WO-2010007220 A2 * | 1/2010 | | F01D 9/04 |

* cited by examiner

CASING STRUCTURE INTERPOSED BETWEEN THE ENGINE AND THE NACELLE HAVING A MOUNTING PLATE WITH BOLTS

BACKGROUND OF THE INVENTION

The present invention relates to the field of aircraft engines, for example turbojets, and it relates more particularly to a casing structure interposed between the engine and the nacelle.

In known manner, in addition to providing the mechanical junction between the engine and the nacelle, such a structure must:

provide continuity of the aerodynamic passage for the bypass stream;

pass and hold (electrical, mechanical, hydraulic) services between the various components of the engine (core, fan, etc.) and the nacelle of the engine;

provide fireproofing protection between the various compartments of the engine and the bypass stream; and provide accessibility to pieces of equipment and to services for maintenance purposes.

The casing structure is made up both of a sectorized cylindrical frame (or of shroud sectors) of small width (of the order of a few hundreds of millimeters around the axis of the engine) suitable for giving easy access on opening the nacelle to the pieces of equipment that it covers (e.g. thrust take-up rods, or indeed various actuators for actuating services), and also of at least one radial arm arranged around the frame. Conventionally, the frame supports scoops of the air bleed system (variable bleed valve (VBV) booster).

Since the time required for maintenance needs to be optimized, the frame thus constitutes an obstacle to accessing pieces of equipment placed beneath it, to enable them to be removed, changed, or verified . . . , on apron and on opening the nacelle in time that is limited and depends on the application, and that needs to take account of the time required for removing and replacing the frame itself. There thus exists a need for a casing structure that provides easy access to these pieces of equipment (i.e. access that is compatible with the time authorized for maintenance on the ground), while enabling all of the above-mentioned functions to be performed and in particular while ensuring reduced disturbance in the air flow passage.

Furthermore, account needs to be taken of the freedom for relative movement (<2 mm) that exists between the intermediate casing shroud and the intermediate casing hub, which has a direct impact on the connection between the arms and the shroud sectors making it impossible to use assembly by means of flat-headed bolts, even though that is essential for reducing aerodynamic impact.

OBJECT AND SUMMARY OF THE INVENTION

A main object of the present invention is thus to mitigate such drawbacks by proposing a casing structure interposed between the engine and the nacelle of an aircraft, the casing comprising:

a shroud surrounding the engine and made up of a plurality of sectors;

a plurality of radial arms, each mounted between two adjacent shroud sectors and each having a base; and a plurality of fastener means for fastening said plurality of shroud sectors to said bases of said plurality of radial arms;

the structure being characterized in that said plurality of fastener means comprise a plurality of plates each mounted flush in a respective groove of corresponding shape in said plurality of shroud sectors, and a set of headed bolts held captive in said plates by their shanks and their threads presenting different diameters;

a set of captive nuts being fastened on said bases to provide respective secure connections between said plurality of shroud sectors and said plurality of radial arms, each of the nuts receiving the thread of a respective captive bolt of said set of headed bolts.

Thus, adding a plate with captive bolts enables one or more shroud sectors to be withdrawn very simply and quickly in order to access the pieces of equipment it protects.

Preferably, the length of said plate corresponds substantially to the width of said shroud.

Advantageously, in order to receive said captive bolts, said plate includes orifices that extend below its surface in the form of wells, which, by passing through said base, also serve to center said plate on said base.

Preferably, said orifices include chamfers at their inlets in order to match the heads of said captive bolts, and thus enable them to be flush.

Advantageously, said captive nuts are made in two portions, a first portion forming the nut proper being made of a first material, and a second portion, forming a retaining cage and acting as a clip, being made of a second material that is more flexible than the first material and that provides the connection with the base via a projecting portion formed in a hole in the base that is to receive said captive bolt. Said first and second portions are secured to each other by tabs that serve to retain the nut by being received under a collar of said nut.

Preferably, said plate includes keying means.

The invention also provides an aircraft engine including a casing structure as specified above.

BRIEF DESCRIPTION OF THE DRAWING

Other characteristics and advantages of the present invention appear from the following description made with reference to the accompanying drawing, which shows an implementation having no limiting character. In the figures.

DETAILED DESCRIPTION OF AN EMBODIMENT

Figure 1:
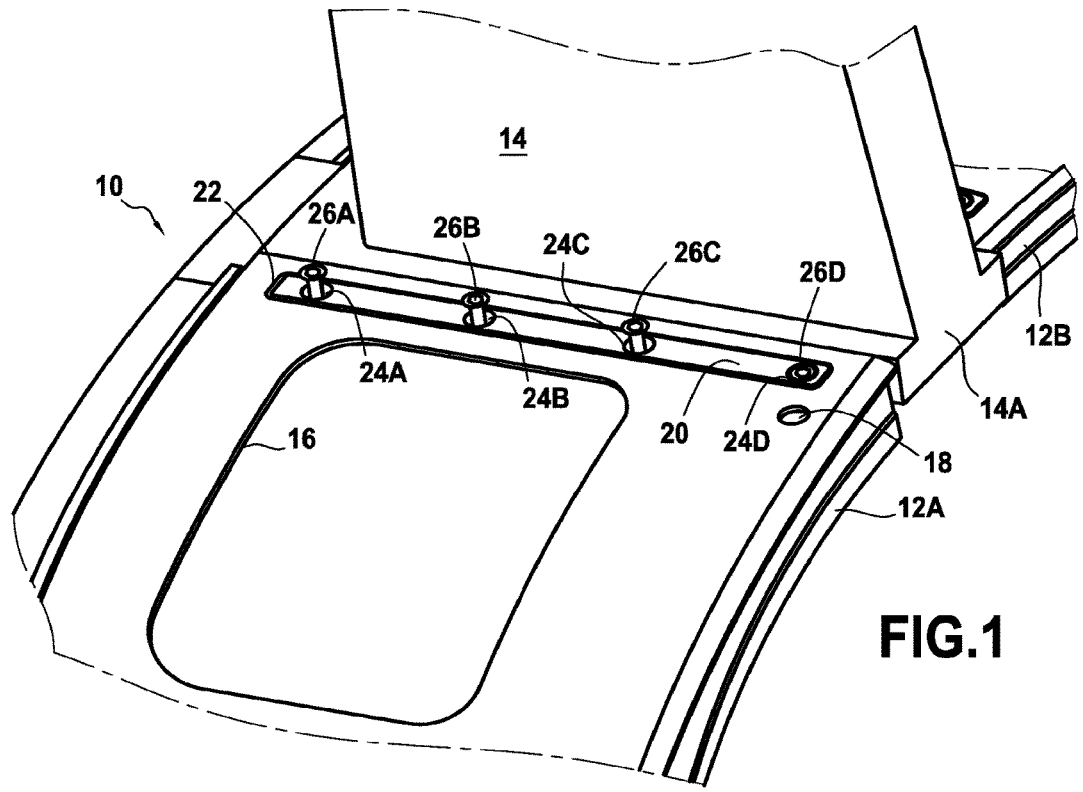
FIG. 1 is a perspective view of a casing structure interposed between the engine and the nacelle in accordance with the invention.
Figure 2:
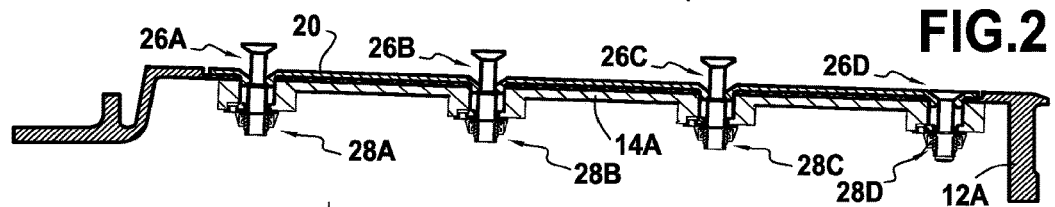
FIG. 2 is a section view of the FIG. 1 casing structure.

FIGS. 1 and 2 show, respectively in perspective and in section, a portion of the casing structure 10 interposed between the engine and the nacelle of an aircraft, typically a turbojet, that is present in the form of a sectorized shroud (with only two of its sectors 12A and 12B being shown) that is connected by at least one radial casing support arm 14 of the nacelle, which arm is substantially the shape of an upside-down T with a base 14A that is extended on both sides and that may present the same curvature as the shroud sector. Depending on the circumference of the engine, on the positions of pieces of equipment such as the thrust take-up rods, and on the actuators for actuating the VBVs or variable stator vanes (VSVs), for example, the shroud may comprise by way of example up to eight adjacent sectors that are separable from one another and that are mounted between a plurality of regularly distributed radial arms. Each sector of the shroud is pierced by openings 16 acting as scoops for one of the air discharge systems of the aircraft (e.g. the variable bleed valve or VBV system). The shroud sectors are held radially by the hub of the casing (not shown) by means of a nut-and-bolt system passing through housings 18 in the shroud sectors.

According to the invention, the shroud sectors are secured to the arms by means of a mounting plate 20 that serves to hold the shroud on the base 14A of the arm while absorbing relative movements between the shroud and the arm. The plate is of a length that corresponds substantially to the width of the shroud, and thus also to the width of the base to which the shroud is to be fastened, and it is in the form of a flat strip of material that is dropped in register with holes that are to receive the fastener means (i.e. the material forms wells extending below (under) the bottom surface of the strip). For example, for a shroud and a base having a width of 350 mm, it is possible to select a plate having a length of about 280 mm and a thickness of a few millimeters.

In order to ensure aerodynamic continuity of the bypass stream, the plate is mounted in a groove 22 forming an indentation that matches the shape (length, width, and depth) of the plate and that thus enables the top face of the plate to be in alignment with the top face of the shroud so that no obstacle is constituted for the air stream.

Figure 2A:
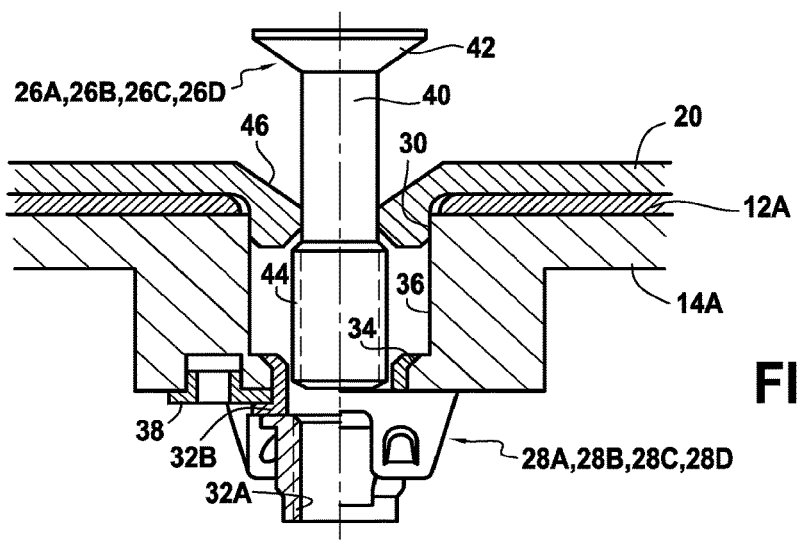
FIG. 2A shows a detail of FIG. 2 concerning a connection bolt.

In order to provide the connection to the base of the arm, the plate is pierced by a plurality of orifices 24A, 24B, 24C, 24D in order to receive headed bolts 26A, 26B, 26C, 26D for screwing into captive type nuts 28A, 28B, 28C, 28D that are clip-fastened to the base 14A. As shown in the enlargement of FIG. 2A, the plate is centered by means of the wells 30 that pass through the shroud 12A to be received in respective holes in the base 14A, and the plate is fastened by the nuts. A first portion 32A forming the nut proper is made of a first material, and a second portion 32B, forming a retaining cage and acting as a clip, is made of a second material that is more flexible than the first material and that provides the connection with the base via a projecting portion 34 formed in the hole 36 in the base that is to receive the bolt. The retaining cage 32B that surrounds the nut 32A conventionally has tabs that serve to retain the nut and that are received under a collar of the nut. Also, a washer 38 serves to hold the retaining cage 32B against the base 14A.

The bolts, which may be said to be "captive", are held captive by the plate by means of a difference in diameter along the shank of the bolt 40, e.g. obtained by tapping.

In the factory, these captive bolts are preferably screwed or possibly pressure mounted in the plate, and thus prepositioned for mounting, and the fact that they are held in the plate (the bolts can only slide in the plate between their heads 42 and their threads 44) serves subsequently to reduce the time required for an operator to mount and/or dismount the shroud.

Since the passage for the bypass air stream is not necessarily cylindrical, it is necessary for the plate to have keying means, which are provided by the two end holes 24A and 24D being drilled at respective different distances from the ends of the plate 20, so that it is not possible to put the plate the wrong way round in its groove 22.

As for the plate itself, in order to ensure aerodynamic continuity of the bypass air stream, the blade has a chamfer 46 in each of its orifices so that the head 42 of each bolt becomes exactly positioned therein and is then flush with the top face of the plate and thus also with the top face of the shroud so as to avoid constituting an obstacle for the air stream. It should be observed that the size of the heads of the bolts determines the depth of the chamfer, and therefore constitutes a constraint that needs to be taken into account when determining the thickness of the plate.

Thus, removing one or more shroud sectors provides better accessibility to certain portions of the engine, as a result in particular of the existence of service passages in the rear portions (trailing edges) of the radial arms incorporated in the intermediate casing and known as outlet guide vanes (OGVs).

The invention claimed is:

1. A casing structure fitted for providing the mechanical junction between the engine and the nacelle of an aircraft, the structure comprising:
   a shroud destined to surround the engine and made up of a plurality of sectors, each of said shroud sectors having a groove recessed from a shroud surface in a thickness direction of the shroud;
   a plurality of radial arms, each radial arm being mounted between two adjacent shroud sectors and each having a base; and
   a plurality of fasteners for fastening said plurality of shroud sectors to said bases of said plurality of radial arms;
   wherein said plurality of fasteners comprise a plurality of plates each mounted flush with the shroud surface in a respective one of the grooves and of a shape corresponding with the respective one of the grooves, and a set of headed bolts having shanks and threads extending through each respective plate in the thickness direction of the shroud, the bolts being held captive in said plates due to their shanks and their threads presenting different diameters;
   a set of captive nuts being fastened on said bases to provide respective secure connections between said plurality of shroud sectors and said plurality of radial arms, each of the nuts receiving the thread of a respective captive bolt of said set of headed bolts,
   wherein in order to receive said captive bolts, each of said plates includes orifices that extend below its bottom surface in said thickness direction, in the form of wells, which, by passing through said base, also serve to center said plate on said base.

2. A casing structure according to claim 1, wherein said orifices include chamfers at their inlets in order to match the heads of said captive bolts, and thus enable them to be flush.

3. A casing structure fitted for providing the mechanical junction between the engine and the nacelle of an aircraft, the structure comprising:
   a shroud destined to surround the engine and made up of a plurality of sectors, each of said shroud sectors having a groove recessed from a shroud surface in a thickness direction of the shroud;
   a plurality of radial arms, each radial arm being mounted between two adjacent shroud sectors and each having a base; and
   a plurality of fasteners for fastening said plurality of shroud sectors to said bases of said plurality of radial arms;
   wherein said plurality of fasteners comprise a plurality of plates each mounted flush with the shroud surface in a respective one of the grooves and of a shape corresponding with the respective one of the grooves, and a set of headed bolts having shanks and threads extending through each respective plate in the thickness direction of the shroud, the bolts being held captive in said plates due to their shanks and their threads presenting different diameters;

a set of captive nuts being fastened on said bases to provide respective secure connections between said plurality of shroud sectors and said plurality of radial arms, each of the nuts receiving the thread of a respective captive bolt of said set of headed bolts, wherein said captive nuts are made in two portions, a first portion forming the nut proper being made of a first material, and a second portion, forming a retaining cage and acting as a clip, being made of a second material that is more flexible than the first material and that provides the connection with the base via a projecting portion formed in a hole in the base that is to receive said captive bolt.

4. A casing structure according to claim 3, wherein said first and second portions are secured to each other by tabs that serve to retain the nut by being received under a collar of said nut.

5. The casing structure according to claim 1, wherein the length of each of said plates corresponds substantially to the width of a respective shroud.

6. The casing structure according to claim 3, wherein the length of each of said plates corresponds substantially to the width of a respective shroud.

7. The casing structure according to claim 1, wherein said plate includes keys.

8. The casing structure according to claim 3, wherein said plate includes keys.

9. The casing structure according to claim 1, wherein the bolts threads are larger than the diameters of the respective apertures through which they extend.

10. A aircraft engine including a casing structure according to claim 1.

11. A aircraft engine including a casing structure according to claim 3.

* * * * *